US011892789B2

(12) United States Patent
Yamasaki et al.

(10) Patent No.: US 11,892,789 B2
(45) Date of Patent: Feb. 6, 2024

(54) FIXING BELT, FIXING DEVICE, AND IMAGE FORMING APPARATUS

(71) Applicant: FUJIFILM Business Innovation Corp., Tokyo (JP)

(72) Inventors: Junko Yamasaki, Kanagawa (JP); Kenta Shingu, Kanagawa (JP); Hideaki Ohara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/152,768

(22) Filed: Jan. 11, 2023

(65) Prior Publication Data

US 2023/0251596 A1 Aug. 10, 2023

(30) Foreign Application Priority Data

Feb. 9, 2022 (JP) ................................ 2022-018998

(51) Int. Cl.
*G03G 15/20* (2006.01)

(52) U.S. Cl.
CPC . *G03G 15/2057* (2013.01); *G03G 2215/2035* (2013.01)

(58) Field of Classification Search
CPC ........... G03G 15/2053; G03G 15/2057; G03G 15/206; G03G 2215/2035
See application file for complete search history.

(56) References Cited

U.S. PATENT DOCUMENTS

| | | | | |
|---|---|---|---|---|
| 9,256,176 | B2 | 2/2016 | Miyahara | |
| 9,874,840 | B2 | 1/2018 | Gotoh et al. | |
| 10,241,450 | B2 | 3/2019 | Morizaki et al. | |
| 10,795,276 | B1 * | 10/2020 | Rokutan ............ | G03G 21/0058 |
| 10,942,475 | B2 | 3/2021 | Fujimoto et al. | |
| 11,327,425 | B2 * | 5/2022 | Yoshikawa ........ | G03G 15/2057 |
| 2005/0031377 | A1 * | 2/2005 | Kabata ................. | G03G 15/755 399/165 |

FOREIGN PATENT DOCUMENTS

| | | |
|---|---|---|
| JP | 2003257592 | 9/2003 |
| JP | 2014228729 | 12/2014 |
| JP | 6057001 | 1/2017 |
| JP | 2018155958 | 10/2018 |
| JP | 2021005026 | 1/2021 |

* cited by examiner

*Primary Examiner* — Hoang X Ngo
(74) *Attorney, Agent, or Firm* — JCIPRNET

(57) ABSTRACT

A fixing belt, in which, in a measurement of a Fourier transform power spectrum of a surface profile of an inner peripheral surface of the fixing belt, a ratio of an average of a power spectral density at a wavelength of 2 μm or more and 6 μm or less to an average of a power spectral density at a wavelength of 10 μm or more and 50 μm or less is 0.82 or more and 0.92 or less.

10 Claims, 4 Drawing Sheets

FIXING BELT, FIXING DEVICE, AND IMAGE FORMING APPARATUS

CROSS-REFERENCE TO RELATED APPLICATIONS

This application is based on and claims priority under 35 USC 119 from Japanese Patent Application No. 2022-018998 filed Feb. 9, 2022.

BACKGROUND

(i) Technical Field

The present invention relates to a fixing belt, a fixing device, and an image forming apparatus.

(ii) Related Art

A fixing belt that fixes a toner image formed on a recording medium onto the recording medium is used in an electrophotographic image forming apparatus (a copier, a facsimile machine, a printer, or the like).

JP2003-257592A discloses "a heating device including a belt, a heating body fixed and supported on an inner side of the belt, a heating body holding member that fixes and supports the heating body, and a pressing member that forms a nip with the heating body, in which a material to be heated is introduced into the nip portion and is conveyed in a sandwiched state together with the belt to apply heat of the heating body to the material to be heated, wherein a highly thermal conductive member that has a higher thermal conductivity than that of the heating body holding member and is in contact with the heating body is fixed and supported on an inner surface side of the belt, and at least a part of the highly thermal conductive member is disposed outside the nip portion in a conveyance direction of the material to be heated".

JP2018-155958A discloses "a fixing device including a heating part that rotates and fixes a toner image on a recording medium, a pressing part that presses the heating part and rotates, and a potential difference applying element that applies a potential difference between the pressing part and the heating part such that the potential of the heating part is higher than the potential of the pressing part".

JP6057001B discloses "a fixing device including an endless belt that contacts a developer image on a recording medium at a nip portion, a heat source that is provided inside the belt and radiates radiant heat, a heat transfer member that includes a contact portion and that absorbs the radiant heat of the heat source and transfers the heat to the belt, the contact portion being in contact with an inner peripheral surface of the belt at a part of the belt in a circumferential direction and at a side opposite to the nip portion with respect to a rotational center position of the belt, and a deforming element that deforms when a temperature of the contact portion exceeds a predetermined set temperature and separates the belt from at least a part of the contact portion".

SUMMARY

Aspects of non-limiting embodiments of the present disclosure relate to a fixing belt that suppresses an increase in initial sliding resistance when grease is used as a lubricant, as compared with a fixing belt in which, in a measurement of a Fourier transform power spectrum of a surface profile of an inner peripheral surface of the fixing belt, a ratio of an average of a power spectral density at a wavelength of 2 μm or more and 6 μm or less to an average of a power spectral density at a wavelength of 10 μm or more and 50 μm or less is less than 0.82 or greater than 0.92.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a fixing belt, wherein, in a measurement of a Fourier transform power spectrum of a surface profile of an inner peripheral surface of the fixing belt, a ratio of an average of a power spectral density at a wavelength of 2 μm or more and 6 μm or less to an average of a power spectral density at a wavelength of 10 μm or more and 50 μm or less is 0.82 or more and 0.92 or less.

DETAILED DESCRIPTION

Figure 1:
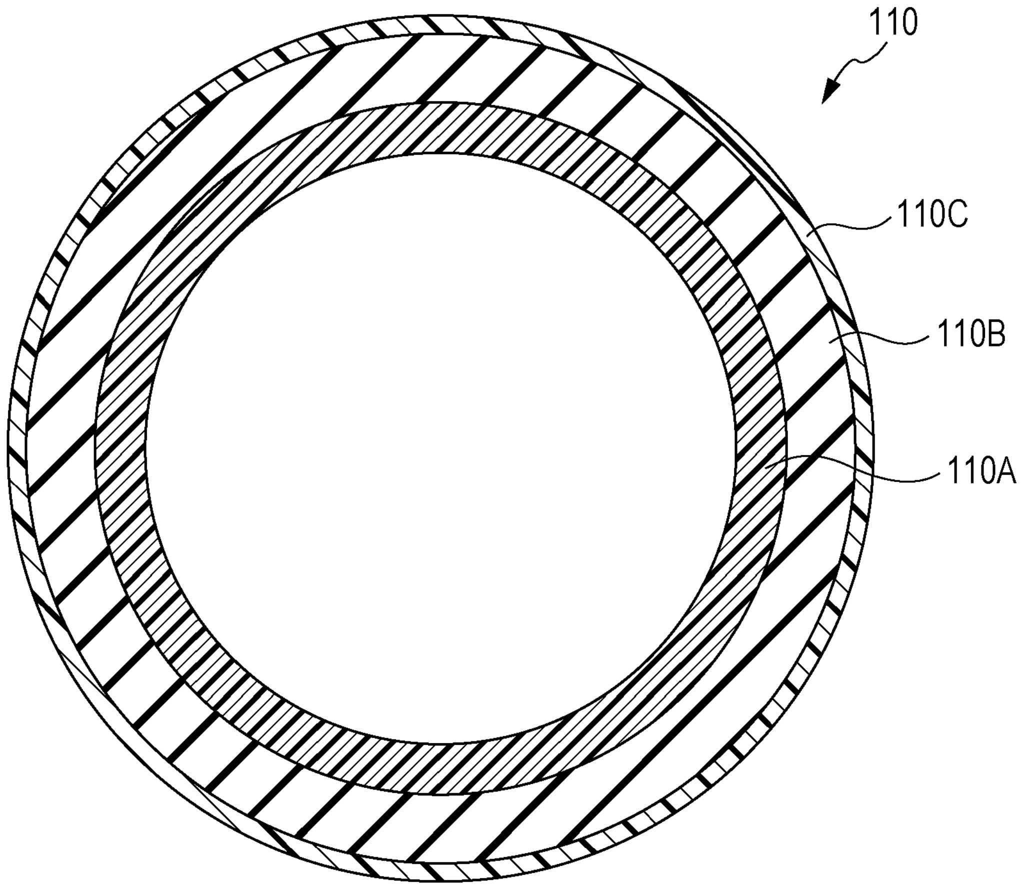
FIG. 1 is a schematic cross-sectional view illustrating an example of a fixing belt according to an exemplary embodiment.

Exemplary embodiments that are examples of the present invention will be described below. The following description and examples are merely examples of the exemplary embodiments and are not intended to limit the scope of the exemplary embodiments.

In numerical ranges described in a stepwise manner in the present specification, an upper limit or a lower limit described in one numerical range may be replaced with an upper limit or a lower limit in another numerical range in the stepwise description.

Further, in a numerical range described in the present specification, an upper limit or a lower limit of the numerical range may be replaced with a value described in an example.

In the present specification, each component may include a plurality of kinds of the relevant substances.

In the present specification, in a case where the amount of each component in a composition is mentioned and a plurality of substances corresponding to the component are present in the composition, the amount of the component indicates the total amount of the plurality of kinds of substances present in the composition, unless otherwise specified.

<Fixing Belt>

In the fixing belt according to an exemplary embodiment, in a measurement of a Fourier transform power spectrum of a surface profile of an inner peripheral surface of the fixing belt, a ratio of an average of a power spectral density at a wavelength of 2 μm or more and 6 μm or less to an average of a power spectral density at a wavelength of 10 μm or more and 50 μm or less is 0.82 or more and 0.92 or less.

With this configuration, the fixing belt according to the exemplary embodiment suppresses an increase in initial sliding resistance when grease is used as a lubricant. The reason is presumed as follows.

In a fixing device including a fixing belt, a rotary member disposed in contact with an outer peripheral surface of the fixing belt, and a pressing member disposed inside the fixing belt and configured to press the fixing belt against the rotary member from an inner peripheral surface of the fixing belt, a lubricant is interposed between the inner peripheral surface of the fixing belt and the pressing member.

When oil is used as the lubricant, although the initial sliding resistance between the inner peripheral surface of the fixing belt and the pressing member of the fixing device in contact with the inner peripheral surface is low, the sliding resistance increases over time due to the low viscosity.

By contrast, when grease is used as the lubricant, the sliding resistance between the inner peripheral surface of the fixing belt and the pressing member of the fixing device in contact with the inner peripheral surface is not easily increased over time, but the initial sliding resistance is increased due to high viscosity.

As a countermeasure therefor, in the fixing belt according to the exemplary embodiment, in a measurement of a Fourier transform power spectrum of a surface profile of an inner peripheral surface of the fixing belt, a ratio of an average of a power spectral density at a wavelength of 2 μm or more and 6 μm or less to an average of a power spectral density at a wavelength of 10 μm or more and 50 μm or less is set within the above range.

When the ratio of the average of the power spectral density at a wavelength of 2 μm or more and 6 μm or less to the average of the power spectral density at a wavelength of 10 μm or more and 50 μm or less is within the above-described range, the inner peripheral surface of the fixing belt has a surface property in which large irregularities and fine irregularities coexist.

The recess of the large irregularities retains the lubricant, and the fine irregularities reduce the contact area between the inner peripheral surface of the fixing belt and the pressing member of the fixing device in contact with the inner peripheral surface.

Accordingly, the grease serving as a lubricant is retained in the recess of the large irregularities to suppress an increase in the sliding resistance over time, while the initial sliding resistance between the inner peripheral surface of the fixing belt and the pressing member of the fixing device in contact with the inner peripheral surface is reduced due to the fine irregularities even though the grease as the lubricant is used.

Thus, it is assumed that the fixing belt according to the exemplary embodiment suppresses an increase in initial sliding resistance when grease is used as a lubricant.

Hereinafter, the fixing belt according to the exemplary embodiment will be described with reference to FIG. 1.

FIG. 1 is a schematic cross-sectional view illustrating an example of a fixing belt according to an exemplary embodiment.

A fixing belt 110 illustrated in FIG. 1 includes a resin base material layer 110A, an elastic layer 110B disposed on the resin base material layer 110A, and a release layer 110C disposed on the elastic layer 110B.

The layer structure of the fixing belt 110 according to the exemplary embodiment is not limited to the layer structure illustrated in FIG. 1, and may be a layer structure in which a metal layer and its protection layer are interposed between the resin base material layer 110A and the elastic layer 110B, a layer structure in which an adhesive layer is interposed between the base material layer 110A and the elastic layer 110B, a layer structure in which an adhesive layer is interposed between the elastic layer 110B and the release layer 110C, or a layer structure in which these layer structures are combined.

Hereinafter, components of the fixing belt according to the exemplary embodiment will be described in detail. The reference signs thereof are omitted in the description.

[Inner Peripheral Surface of Fixing Belt]

In the fixing belt according to the exemplary embodiment, in a measurement of a Fourier transform power spectrum of a surface profile of an inner peripheral surface of the fixing belt, a ratio of an average of a power spectral density at a wavelength of 2 μm or more and 6 μm or less to an average of a power spectral density at a wavelength of 10 μm or more and 50 μm or less is preferably 0.82 or more and 0.92 or less, and more preferably 0.85 or more and 0.90 or less.

From the viewpoint of suppressing an increase in the initial sliding resistance, the average of the power spectral density at a wavelength of 2 μm or more and 6 μm or less is preferably 8 or more and 10 or less, and more preferably 8.3 or more and 9 or less.

From the viewpoint of retention of grease as a lubricant, the average of the power spectral density at a wavelength of 10 μm or more and 50 μm or less is preferably 9.5 or more and 11 or less, and more preferably 9.6 or more and 10 or less.

The average of the power spectral density at a wavelength of 10 μm or more and 50 μm or less and the average of the power spectral density at a wavelength of 2 μm or more and 6 μm or less can be controlled by blasting the surface of a mold for forming a layer constituting the inner peripheral surface of the fixing belt, such as a resin base material layer, and transferring the surface property of the mold to the layer constituting the inner peripheral surface of the fixing belt.

Specifically, by adjusting the medium material, the medium size, and the blast treatment speed, the average of the power spectral density at a wavelength of 10 μm or more and 50 μm or less and the average of the power spectral density at a wavelength of 2 μm or more and 6 μm or less can be controlled.

In particular, when the needle-like or fibrous filler is contained in the layer constituting the inner peripheral surface of the fixing belt, the average of the power spectral density at a wavelength of 10 μm or more and 50 μm or less and the average of the power spectral density at a wavelength of 2 μm or more and 6 μm or less can be controlled.

The Fourier transform power spectrum of the surface profile of the inner peripheral surface of the fixing belt is calculated as follows.

The surface profile of the center in the axial direction of the inner peripheral surface of the fixing belt was measured with VK-X150 (manufactured by Keyence Corporation) with a 10× lens at a measurement pitch of 0.2 μm. Fourier transform is performed on the surface profile data to obtain a power spectrum (log (square of absolute value)) from the spectrum of the Fourier transform.

From the obtained Fourier transform power spectrum, the average of the power spectral density at a wavelength of 10 μm or more and 50 μm or less and the average of the power spectral density at a wavelength of 2 μm or more and 6 μm or less are obtained.

[Resin Base Material Layer]

The resin base material layer is a layer containing a resin. The resin base material layer forms the inner peripheral surface of the fixing belt.

The resin base material layer preferably contains a filler in addition to the resin. In addition, the resin base material layer may contain a well-known additive.

The content of the resin in the resin base material layer is preferably 50% by mass or more, more preferably 60% by mass or more, still more preferably 70% by mass or more, particularly preferably 80% by mass or more, and most preferably 90% by mass or more with respect to the total mass of the resin base material layer.

[Resin]

It is preferable that the resin is a heat-resistant resin.

Examples of the resin include heat-resistant resins having high heat resistance and high strength, such as liquid crystal materials such as a polyimide, an aromatic polyamide, and a thermotropic liquid crystal polymer, and in addition to these, polyester, polyethylene terephthalate, polyether sulfone, polyether ketone, polysulfone, polyimideamide, and the like are used.

In particular, a polyimide is preferable as the resin.

Examples of the polyimide include imidized products of polyamic acids (precursors of polyimide resins) that are each a polymer of a tetracarboxylic dianhydride and a diamine compound. Specific examples of the polyimide include resins produced by polymerizing equimolar amounts of a tetracarboxylic dianhydride and a diamine compound in a solvent to prepare a polyamic acid solution, and imidizing the polyamic acid.

Examples of the tetracarboxylic dianhydride include both an aromatic compound and an aliphatic compound, but from the viewpoint of heat resistance, an aromatic compound is preferable.

Examples of the aromatic tetracarboxylic dianhydride include pyromellitic dianhydride, 3,3',4,4'-benzophenone tetracarboxylic dianhydride, 3,3',4,4'-biphenyl sulfone tetracarboxylic dianhydride, 1,4,5,8-naphthalene tetracarboxylic dianhydride, 2,3,6,7-naphthalene tetracarboxylic dianhydride, 3,3',4,4'-biphenyl ether tetracarboxylic dianhydride, 3,3',4,4'-dimethyl diphenyl silane tetracarboxylic dianhydride, 3,3',4,4'-tetraphenyl silane tetracarboxylic dianhydride, 1,2,3,4-furantetracarboxylic dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenyl propane dianhydride, 3,3',4,4'-perfluoro isopropylidene diphthalic dianhydride, 3,3',4,4'-biphenyl tetracarboxylic dianhydride, 2,3,3',4'-biphenyl tetracarboxylic dianhydride, bis(phthalic acid) phenylphosphine oxide dianhydride, p-phenylene-bis(triphenylphthalic acid) dianhydride, m-phenylene-bis(triphenylphthalic acid) dianhydride, bis(triphenylphthalic acid)-4,4'-diphenyl ether dianhydride, and bis(triphenylphthalic acid)-4,4'-diphenylmethane dianhydride.

Examples of the aliphatic tetracarboxylic dianhydride include aliphatic or alicyclic tetracarboxylic dianhydrides, such as butane tetracarboxylic dianhydride, 1,2,3,4-cyclobutane tetracarboxylic dianhydride, 1,3-dimethyl-1,2,3,4-cyclobutane tetracarboxylic dianhydride, 1,2,3,4-cyclopentane tetracarboxylic dianhydride, 2,3,5-tricarboxycyclopentyl acetic dianhydride, 3,5,6-tricarboxynorbornane-2-acetic dianhydride, 2,3,4,5-tetrahydrofuran tetracarboxylic dianhydride, 5-(2,5-dioxotetrahydrofuryl)-3-methyl-3-cyclohexene-1,2-dicarboxylic dianhydride, and bicyclo[2,2,2]-oct-7-ene-2,3,5,6-tetracarboxylic dianhydride; and aliphatic tetracarboxylic dianhydrides having an aromatic ring, such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione.

Among these, as the tetracarboxylic dianhydride, an aromatic tetracarboxylic dianhydride is preferable, specifically, for example, pyromellitic dianhydride, 3,3',4,4'-biphenyl tetracarboxylic dianhydride, 2,3,3',4'-biphenyl tetracarboxylic dianhydride, 3,3',4,4'-biphenyl ether tetracarboxylic dianhydride, or 3,3',4,4'-benzophenone tetracarboxylic dianhydride is preferable, pyromellitic dianhydride, 3,3',4,4'-biphenyl tetracarboxylic dianhydride, or 3,3',4,4'-benzophenone tetracarboxylic dianhydride is more preferable, and 3,3',4,4'-biphenyl tetracarboxylic dianhydride is particularly preferable.

The tetracarboxylic dianhydrides may be used alone or in combination of two or more types.

In addition, in a case where two or more kinds of tetracarboxylic dianhydrides are used in combination, aromatic tetracarboxylic dianhydrides or aliphatic tetracarboxylic dianhydrides may be used in combination, or an aromatic tetracarboxylic dianhydride and an aliphatic tetracarboxylic dianhydride may be used in combination.

Meanwhile, the diamine compound is a diamine compound having two amino groups in the molecular structure. Examples of the diamine compound include both an aromatic compound and an aliphatic compound, but an aromatic compound is preferable.

Examples of the diamine compound include aromatic diamines such as p-phenylenediamine, m-phenylenediamine, 4,4'-diaminodiphenylmethane, 4,4'-diaminodiphenylethane, 4,4'-diaminodiphenyl ether, 4,4'-diaminodiphenyl sulfide, 4,4'-diaminodiphenyl sulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenyl ether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenylene isopropylidene)bisaniline, 4,4'-(m-phenylene isopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamines having two amino groups bonded to an aromatic ring and a heteroatom other than a nitrogen atom of the amino groups, such as diaminotetraphenylthiophene; and aliphatic diamines and alicyclic diamines, such as 1,1-metaxylylene diamine, 1,3-propane diamine, tetramethylene diamine, pentamethylene diamine, octamethylene diamine, nonamethylene diamine, 4,4-diaminoheptamethylene diamine, 1,4-diaminocyclohexane, isophorone diamine, tetrahydrodicyclopentadienylene diamine, hexahydro-4,7-methanoindanylene dimethylene diamine, tricyclo[6,2,1,02.7]-undecylene dimethyl diamine, and 4,4'-methylene bis(cyclohexylamine).

Among these, as the diamine compound, an aromatic diamine compound is preferable, and specifically, for example, p-phenylenediamine, m-phenylenediamine, 4,4'-diaminodiphenylmethane, 4,4'-diaminodiphenyl ether, 3,4'-diaminodiphenyl ether, 4,4'-diaminodiphenyl sulfide, and 4,4'-diaminodiphenyl sulfone are preferable, and 4,4'-diaminodiphenyl ether and p-phenylenediamine are particularly preferable.

The diamine compounds may be used alone or in combination of two or more kinds thereof.

In addition, in a case where two or more kinds of diamine compounds are used in combination, aromatic diamine compounds or aliphatic diamine compounds may be used in combination, or an aromatic diamine compound and an aliphatic diamine compound may be used in combination.

Among these, from the viewpoint of heat resistance, an aromatic polyimide (specifically, an imidized product of a polyamic acid (a precursor of a polyimide resin) which is a polymer of an aromatic tetracarboxylic dianhydride and an aromatic diamine compound) is preferable as the polyimide.

The aromatic polyimide is more preferably a polyimide having a structural unit represented by General Formula (PI1).

[Chem.1]

(PI1)

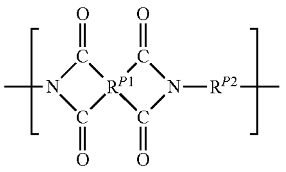

In General Formula (PI1), $R^{P1}$ represents a phenyl or biphenyl group, and $R^{P2}$ represents a divalent aromatic group.

Examples of the divalent aromatic group represented by $R^{P2}$ include phenylene, naphthyl, biphenyl, and diphenyl ether groups. As the divalent aromatic group, a phenylene group or a biphenyl group is preferable from the viewpoint of bending durability.

The number-average molecular weight of the polyimide is preferably 5,000 or more and 100,000 or less, more preferably 7,000 or more and 50,000 or less, and still more preferably 10,000 or more and 30,000 or less.

The number-average molecular weight of the polyimide is measured by a gel permeation chromatography (GPC) method under the following measurement conditions.

Column: TOSOH TSKgel α-M (7.8 mm I.D×30 cm)

Eluent: dimethylformamide (DMF)/30 mM LiBr/60 mM phosphoric acid

Flow velocity: 0.6 mL/min

Injection volume: 60 μL

Detector: RI (differential refractive index detector)

[Filler]

The filler is preferably a thermally conductive filler. Examples of the thermally conductive filler include a filler having a thermal conductivity of 20 W/mK or more at 150° C. The thermal conductivity is measured using a thermal conductivity measuring device (ai-Phase Mobile manufactured by ai-Phase Co., Ltd.).

Examples of the filler include inorganic fillers such as carbides (for example, carbon black, carbon fiber, and carbon nanotubes), silica, titanium oxide, aluminum oxide, silicon carbide, talc, mica, kaolin, calcium carbonate, calcium silicate, magnesium oxide, graphite, silicon nitride, boron nitride, cerium oxide, and magnesium carbonate.

Of the above-described examples, needle-like or fibrous fillers are preferable. When the needle-like or fibrous filler is contained in the resin base material layer, the surface properties of the inner peripheral surface of the resin base material layer (that is, the inner peripheral surface of the fixing belt) can be easily controlled within the above-described range, and an increase in the initial sliding resistance can be easily suppressed.

When the needle-like or fibrous filler is contained in the resin base material layer, in a case where the inner peripheral surface of the resin base material layer (that is, the inner peripheral surface of the fixing belt) is worn over time, the needle-like or fibrous filler is exposed to exhibit a function as a lubricant and a function of reducing the contact area between the inner peripheral surface of the resin base material layer (that is, the inner peripheral surface of the fixing belt) and the pressing member in contact with the inner peripheral surface, thereby easily suppressing an increase in sliding resistance over time.

The aspect ratio of the needle-like or fibrous filler is preferably 5 or more, and more preferably 10 or more.

Here, the aspect ratio means a ratio of a long axis length (that is, maximum diameter) to a short axis length (that is, long axis length/short axis length) in the filler.

The long axis length of the filler refers to the maximum diameter of the filler (that is, the maximum length of a straight line drawn between any two points on the contour line of the cross section of the filler). Meanwhile, the short axis length of the filler refers to the maximum length among the lengths in the direction orthogonal to the extension line of the long axis length of the filler.

When the aspect ratio of the needle-like or fibrous filler is 5 or more, the surface properties of the inner peripheral surface of the resin base material layer (that is, the inner peripheral surface of the fixing belt) can be easily controlled within the above-described range, and an increase in the initial sliding resistance can be easily suppressed. In addition, when the inner peripheral surface of the resin base material layer (that is, the inner peripheral surface of the fixing belt) is worn over time, the needle-like or fibrous filler is exposed to serve as a lubricant and to reduce the contact area between the inner peripheral surface of the resin base material layer (that is, the inner peripheral surface of the fixing belt) and the pressing member in contact with the inner peripheral surface, thereby easily suppressing an increase in sliding resistance over time.

However, the aspect ratio of the needle-like or fibrous filler is preferably 100 or less, more preferably 80 or less, and still more preferably 60 or less, from the viewpoint of strength.

Examples of the needle-like or fibrous filler include carbides (carbon fiber, carbon nanotubes, and the like), silica, titanium oxide, aluminum oxide, aluminum nitride, and boron nitride.

Among these, from the viewpoint of suppressing an increase in sliding resistance in the initial stage and over time, a carbide (carbon fiber, carbon nanotubes, or the like) is preferable, and carbon nanotubes are more preferable.

The carbon nanotubes may be single-layer carbon nanotubes or multi-layer carbon nanotubes.

From the viewpoint of suppressing an increase in sliding resistance in the initial stage and over time, carbon nanotubes having an average diameter of 0.005 μm or more and 2 μm or less (preferably 0.01 μm or more and 1.5 μm or less, and more preferably 0.02 μm or more and 1.0 μm or less) and an average length of 0.5 μm or more and 100 μm or less (preferably 1 μm or more and 60 μm or less, and more preferably 2 μm or more and 20 μm or less) are preferable.

Here, the aspect ratio of the filler and the average diameter and average length of the carbon nanotubes are values obtained by observing a target filler with an optical microscope, and arithmetically averaging the values of 100 particles of the filler determined from the obtained image.

In the measurement of the aspect ratio or the like of the filler contained in the resin base material layer, the surface of the resin base material layer may be observed with an optical microscope, or the resin contained in the resin base material layer may be dissolved in a solvent and the remaining filler may be observed with an optical microscope.

[Well-Known Additives]

Examples of well-known additives that can be contained in the resin base material layer include a softener (paraffin-based or the like), a processing aid (stearic acid or the like), an antioxidant (amine-based or the like), and a vulcanizing agent (sulfur, metal oxide, peroxide, or the like).

[Film Thickness]

From the viewpoints of thermal conductivity, mechanical strength, and the like, the film thickness of the resin base material layer is preferably 30 μm or more and 200 μm or less, and particularly preferably 50 μm or more and 150 μm or less.

[Formation of Resin Base Material Layer]

The resin base material layer is obtained by preparing a coating liquid for forming a base material layer containing a resin and an additive used as necessary, applying the obtained coating liquid for forming a base material layer to a cylindrical mold, and drying the coating liquid.

In a case where the resin is a polyimide, the resin base material layer is obtained by preparing a coating liquid for forming a base material layer containing a polyamic acid (a precursor of a polyimide resin) and an additive used as necessary, applying the obtained coating liquid for forming a base material layer onto a cylindrical mold, and firing (that is, imidizing) the coating liquid.

The surface of the cylindrical aluminum mold is preliminary subjected to blasting, and the surface property of the cylindrical mold is transferred to the inner peripheral surface of the resin base material layer, thus controlling the surface property of the inner peripheral surface of the fixing belt.

An optimum manufacturing method may be used in accordance with the configuration of the inner surface.

[Elastic Layer]

The elastic layer contains an elastic material.

The elastic layer may contain known additives in addition to the elastic material.

The content of the elastic material in the elastic layer is preferably 50% by mass or more, more preferably 60% by mass or more, still more preferably 70% by mass or more, particularly preferably 80% by mass or more, and most preferably 90% by mass or more with respect to the total mass of the resin base material layer.

[Elastic Material]

Examples of the elastic material include a fluororesin, a silicone resin, a silicone rubber, a fluororubber, and a fluorosilicone rubber. Among these, from the viewpoint of heat resistance, thermal conductivity, insulating properties, and the like, a silicone rubber and a fluororubber are preferable, and a silicone rubber is more preferable as the elastic material.

Examples of the silicone rubber include an RTV silicone rubber, an HTV silicone rubber, and a liquid silicone rubber, and specific examples thereof include a polydimethylsilicone rubber (MQ), a methylvinylsilicone rubber (VMQ), a methylphenylsilicone rubber (PMQ), and a fluorosilicone rubber (FVMQ).

It is preferable that the silicone rubber is mainly of an addition reaction type as a crosslinking form. In addition, various types of functional groups are known for the silicone rubber, and a dimethyl silicone rubber having a methyl group, a methyl phenyl silicone rubber having a methyl group and a phenyl group, a vinyl silicone rubber having a vinyl group (vinyl group-containing silicone rubber), and the like are preferable.

In addition, the silicone rubber is more preferably a vinyl silicone rubber having a vinyl group, and even more preferably a silicone rubber having an organopolysiloxane structure with a vinyl group and a hydrogen organopolysiloxane structure with a hydrogen atom bonded to a silicon atom (that is, SiH).

Examples of the fluororubber include vinylidene fluoride-based rubber, ethylene tetrafluoride/propylene-based rubber, ethylene tetrafluoride/perfluoromethyl vinyl ether rubber, phosphazene-based rubber, and fluoropolyether.

It is preferable that the main component of the elastic material is a silicone rubber (that is, the elastic material contains 50% by mass or more of a silicone rubber with respect to the total mass of the elastic material).

The content of the silicone rubber is more preferably 90% by mass or more and still more preferably 99% by mass or more, and may be 100% by mass, with respect to the total mass of the elastic material used for the elastic layer (1).

[Well-Known Additives]

The elastic layer may contain additives such as a filler, a softener (paraffin-based or the like), a processing aid (stearic acid or the like), an antioxidant (amine-based or the like), and a vulcanizing agent (sulfur, metal oxide, peroxide, or the like).

[Film Thickness]

The film thickness of the elastic layer is, for example, preferably 30 μm or more and 600 μm or less, and more preferably 100 μm or more and 500 μm or less.

First, the resin base material layer and the release layer are peeled off from the fixing belt in the same manner as in the measurement of thermal conductivity.

The film thickness of the resulting target elastic layer is measured with RHEOVIBRON (available from Orientec Co., Ltd.) with an amplitude of 50 μm at a frequency of 10 Hz, and a value at 150° C. is used.

[Formation of Elastic Layer]

The elastic layer may be formed by a known method, for example, a coating method.

In the case where a silicone rubber is used as the elastic material of the elastic layer, for example, first, a coating liquid for forming an elastic layer containing a liquid silicone rubber, which is cured by heating to become a silicone rubber, is prepared. Next, the coating liquid for forming an elastic layer is applied onto the base material layer to form a coating film, and the coating film is vulcanized as necessary to form an elastic layer on the base material layer. In the vulcanization of the coating film, the vulcanization temperature is, for example, 150° C. or more and 250° C. or less, and the vulcanization time is, for example, 30 minutes or more and 120 minutes or less.

(Release Layer)

The release layer prevents the melted toner image from adhering to the surface that comes into contact with the recording medium (that is, the outer peripheral surface) during fixing.

The release layer is required to have, for example, heat resistance and releasability. From this viewpoint, a heat-resistant release material is preferably used as the material constituting the release layer, and specific examples thereof include a fluororubber, a fluororesin, a silicone resin, and a polyimide resin.

Among these, a fluororesin is preferable as the heat-resistant release material.

Specific examples of fluororesins include tetrafluoroethylene-perfluoroalkylvinylether copolymer (PFA), polytetrafluoroethylene (PTFE), tetrafluoroethylene-hexafluoropropylene copolymer (FEP), polyethylene-tetrafluoroethylene copolymer (ETFE), polyvinylidene fluoride (PVDF), polychlorotrifluoroethylene (PCTFE), and vinyl fluoride (PVF).

The elastic layer side surface of the release layer may be subjected to a surface treatment. The surface treatment may be a wet treatment or a dry treatment, and examples thereof include a liquid ammonia treatment, an excimer laser treatment, and a plasma treatment.

The thickness of the release layer is preferably 10 μm or more and 100 μm or less, and more preferably 20 μm or more and 50 μm or less.

The release layer may be formed by a known method such as a coating method.

Alternatively, the release layer may be formed by preparing a tubular release layer in advance and covering the outer periphery of the elastic layer with the release layer. An adhesive layer (for example, an adhesive layer containing a silane coupling agent having an epoxy group) may be formed on the inner surface of the tubular release layer, and then the outer periphery of the elastic layer may be covered with the release layer with the adhesive layer.

The fixing belt according to the exemplary embodiment preferably has a film thickness of, for example, 0.06 mm or more and 0.90 mm or less, more preferably 0.15 mm or more and 0.70 mm or less, and even more preferably 0.10 mm or more and 0.60 mm or less.

[Application of Fixing Belt Member]

The fixing belt according to the exemplary embodiment may be applied to, for example, a heating belt or a pressure belt. The heating belt may be either a heating belt heated by electromagnetic induction or a heating belt heated by an external heat source.

When the fixing belt according to the exemplary embodiment is applied to a heating belt that is heated by electromagnetic induction, a metal layer (heating layer) that generates heat by electromagnetic induction is preferably provided between the base material layer and the elastic layer.

<Fixing Device>

The fixing device according to an exemplary embodiment may be, for example, a fixing device including a fixing belt, a rotary member disposed in contact with the outer peripheral surface of the fixing belt, a pressing member disposed inside the fixing belt and presses the fixing belt against the rotary member from the inner peripheral surface of the fixing belt, and grease interposed between the inner peripheral surface of the fixing belt and the pressing member. The fixing belt according to the exemplary embodiment is used as the fixing belt.

Examples of the grease include synthetic lubricating oil grease obtained by mixing a solid substance with a liquid.

Examples of the synthetic lubricating oil grease include silicone grease (that is, grease containing silicone oil) and fluorine grease (that is, grease containing fluorine oil).

Examples of the solid substance include aluminum, silver, copper, nickel, zinc oxide, aluminum oxide, silicon oxide, magnesium oxide, aluminum nitride, boron nitride, silicon nitride, metallic silicon, lithium soap, polytetrafluoroethylene (PTFE), carbon black, and molybdenum disulfide.

Examples of the silicone oil include dimethyl silicone oil, dimethyl silicone oil to which an organic metal salt is added, dimethyl silicone oil to which a hindered amine is added, dimethyl silicone oil to which an organic metal salt and a hindered amine are added, methyl phenyl silicone oil, amino-modified silicone oil, amino-modified silicone oil to which an organic metal salt is added, amino-modified silicone oil to which a hindered amine is added, carboxy-modified silicone oil, silanol-modified silicone oil, and sulfonic acid-modified silicone oil.

Examples of the fluorine oil include perfluoropolyether oil and modified perfluoropolyether oil.

In the fixing device according to the exemplary embodiment, the contact surface of the pressing member that contacts the inner peripheral surface of the fixing belt is preferably made of metal, ceramic, glass, a planar heating element, a silicone rubber pad, or the like. As a surface layer of the contact surface, a layer of a fluororesin, a resin having a methyl group and methyl fluoride, a heat-resistant liquid crystal polymer (LCP), a polyphenylene sulfide resin (PPS), or the like may be provided.

Hereinafter, examples of the fixing device according to exemplary embodiments will be described with reference to the drawings.

First Exemplary Embodiment of Fixing Device

Figure 2:
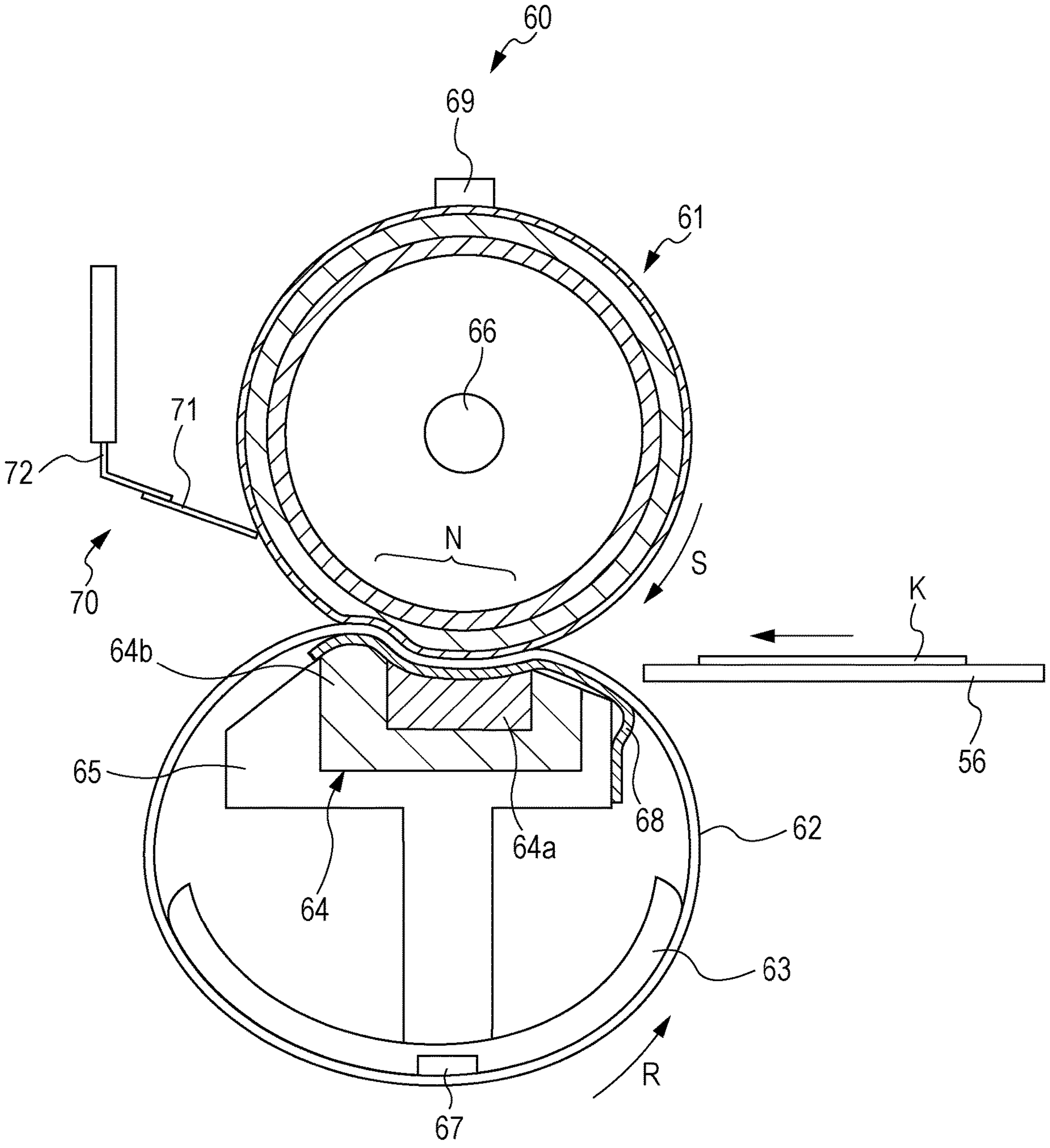
FIG. 2 is a schematic view illustrating an example of a first exemplary embodiment of a fixing device according to an exemplary embodiment.

The first exemplary embodiment of the fixing device will be described with reference to FIG. 2. FIG. 2 is a schematic view illustrating an example of the first exemplary embodiment of the fixing device (that is, a fixing device 60).

As illustrated in FIG. 2, the fixing device 60 includes, for example, a heating roller 61 (an example of a rotary member) that is rotationally driven, a pressure belt 62 (an example of a fixing belt), and a pressing pad 64 (an example of a pressing member) that presses the heating roller 61 via the pressure belt 62.

For example, it is desired that the pressure belt 62 and the heating roller 61 are pressed against each other by the pressing pad 64. Therefore, the pressure belt 62 may be pressed against the heating roller 61, or the heating roller 61 may be pressed against the heating roller 61.

The heating roller 61 includes a halogen lamp 66 (an example of the heating device) therein. The heating element is not limited to a halogen lamp and may alternatively be other heating members that generate heat.

A temperature-sensitive element 69, for example, is disposed in contact with the surface of the heating roller 61.

Turning on the halogen lamp 66 is controlled on the basis of the temperature measured by the temperature-sensitive element 69, so that the surface temperature of the heating roller 61 is maintained at a target set temperature (for example, 170° C.).

The pressure belt 62 is rotatably supported by, for example, the pressing pad 64 and a belt guide 63 that are disposed within the pressure belt 62. The pressure belt 62 is pressed against the heating roller 61 by the pressing pad 64 at a nip region N (nip portion).

The pressing pad 64 is disposed, for example, in a state of being pressed against the heating roller 61 via the pressure belt 62 in the inner side of the pressure belt 62, so that the nip region N is formed between the pressing pad 64 and the heating roller 61.

In the pressing pad 64, for example, a front nipping member 64*a* for securing a wide nipping region N is disposed on an entrance side of the nip region N, and a separation nipping member 64*b* for giving a distortion to the heating roller 61 is disposed on an exit side of the nip region N.

In order to reduce the sliding resistance between the inner peripheral surface of the pressure belt 62 and the pressing pad 64, for example, a sheet-like sliding member 68 is disposed on surfaces of the front nipping member 64*a* and the separation nipping member 64*b* that are in contact with the pressure belt 62. The pressing pad 64 and the sliding member 68 are held by a holding member 65 made of metal.

Grease (not shown) is interposed between the pressure belt 62 and the sliding member 68.

The belt guide 63 is attached to the holding member 65, for example, so that the pressure belt 62 is rotated.

The heating roller 61 is rotated in a direction indicated by an arrow S by, for example, a driving motor (not shown), and the pressure belt 62 is driven by this rotation and rotates in a direction indicated by an arrow R, which is opposite to the rotational direction of the heating roller 61. That is, for example, while the heating roller 61 rotates clockwise in FIG. 2, the pressure belt 62 rotates counterclockwise.

A sheet K (an example of a recording medium) having an unfixed toner image thereon is guided, for example, by a fixation entrance guide 56, and is transported to the nip region N. As the sheet K travels through the nip region N, the toner image on the sheet K that has not been fixed thereon is fixed thereon by pressure and heat applied to the nip region N.

In the fixing device 60, for example, the front nipping member 64*a* having a concave shape following the outer peripheral surface of the heating roller 61 ensures a wider nipping region N than in a configuration in which the front nipping member 64*a* is not provided.

In addition, in the fixing device 60, for example, the separation nipping member 64*b* is disposed so as to protrude with respect to the outer peripheral surface of the heating roller 61, so that the distortion of the heating roller 61 is locally increased in the exit region of the nip region N.

When the separation nipping member 64*b* is arranged in this manner, for example, when the sheet K after fixing passes through the separation nipping region, the sheet K passes through a locally large distortion, so that the sheet K is easily separated from the heating roller 61.

A separation member 70 as a separation assisting element is provided downstream of the nip region N of the heating roller 61, for example. The separation member 70 is held by a holding member 72 in a state in which a separation claw 71 is disposed near the heating roller 61 and extends in a direction opposed to the rotational direction of the heating roller 61 (i.e., counter direction), for example.

Second Exemplary Embodiment of Fixing Device

Figure 3:
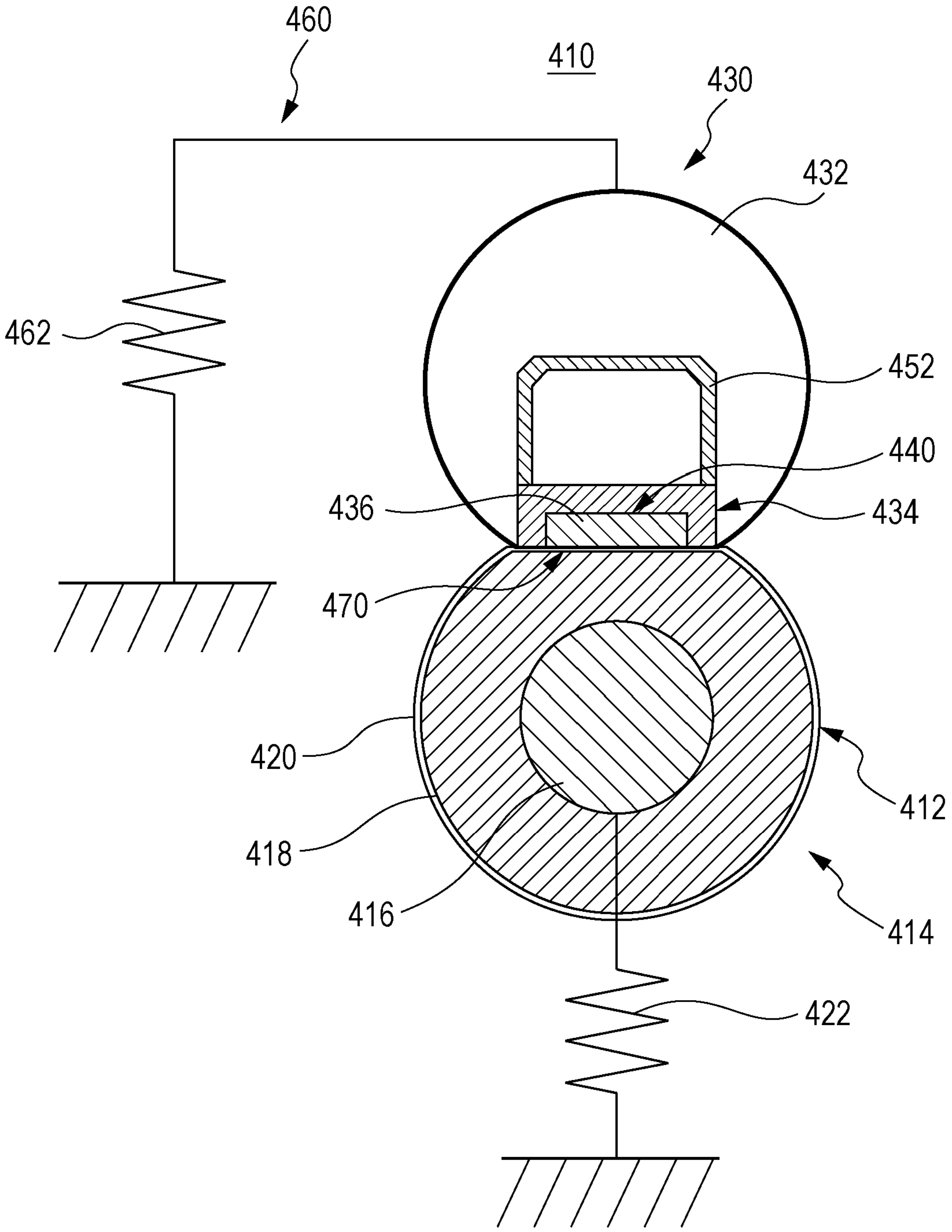
FIG. 3 is a schematic view illustrating an example of a second exemplary embodiment of a fixing device according to an exemplary embodiment.

The second exemplary embodiment of the fixing device will be described with reference to FIG. 3. FIG. 3 is a schematic view illustrating an example of the second exemplary embodiment of the fixing device (that is, a fixing device 410).

As illustrated in FIG. 3, the fixing device 410 includes a pressing part 414 and a heating part 430 facing the pressing part 414.

The pressing part 414 includes a cylindrical roller member 412 (an example of a rotary member), is provided so as to face the heating part 430, is pressed against the outer surface of a heating belt 432 of the heating part 430, and is rotated by a driving device (not illustrated).

In the pressing part 414, the roller member 412 is a so-called soft roller including, for example, a shaft 416 made of a metal material such as iron, stainless steel, or aluminum, an elastic layer 418 that covers the shaft 416, and a release layer 420 that covers or is applied to the elastic layer 418. The release layer 420 is made of an insulating material having high releasability, such as PFA.

In the pressing part 414, the roller member 412 is grounded from the shaft 416 of the roller member 412 via a pressing part-side resistor 422. By grounding the pressing part 414 via the pressing part-side resistor 422, current leakage (leak current) from the electrode of a planar heating element 440 of the heating part 430 can be suppressed.

The roller member 412 of the pressing part 414 is pressed against the heating part 430 by a pressing member (not illustrated) made of an elastic body such as a coil spring. For example, one end of the pressing member is attached to the shaft 416, and the other end is attached to the main body of the image forming apparatus.

The heating part 430 includes the heating belt 432 (an example of a fixing belt), the planar heating element 440 serving as a heating member that heats the heating belt 432 from the inner peripheral surface thereof and provided inside the heating belt 432, a holding member 434 that holds the planar heating element 440, and a frame member 452 that supports the holding member 434. The holding member 434 is supported by the frame member 452 so as to withstand the pressure from the pressing part 414.

A unit including the planar heating element 440, the holding member 434, and the frame member 452 corresponds to an example of a pressing member.

In the heating part 430, for example, circular support members (not illustrated) that support the heating belt 432 are provided at both ends of the heating belt 432 in the longitudinal direction, the support members are provided with heating member gears (not illustrated) that rotate the heating belt 432, and one side of the heating member gears is connected to a driving device (not illustrated) such as a motor in a main body of an image forming apparatus. The heating belt 432 is rotated.

In the heating part 430, the planar heating element 440 serving as a heating member is formed of, for example, an elongated plate-shaped body extending in the longitudinal direction of the heating part 430, and includes an electrically insulating base, an insulating layer made of a polyimide-based heat-resistant resin, a pair of electrodes for power supply, and a resistance heating part that is made of, for example, stainless steel and generates heat when electric power is supplied from the electrodes. The electrodes and the resistance heating part are connected by a power feed portion, and the electrodes, the power feed portion, and the resistance heating part are buried in an insulating layer. The electrodes of the planar heating element 440 are grounded via a heating part-side resistor 462.

In the heating part 430, the holding member 434 is made of, for example, a resin material having high heat resistance, such as a liquid crystal polymer (LCP), and a groove 436 for holding the planar heating element 440 is formed in the longitudinal direction on the side facing the pressing part 414.

The holding member 434 is pressed by the pressing part 414 with the planar heating element 440 being held by the groove 436, so that a pressing region 470 is formed.

In the heating part 430, the frame member 452 is made of, for example, a metal material, supports the holding member 434, and has both ends fixed to a support member (not illustrated) so that the holding member 434 can withstand pressure from the pressing part 414. The heating part 430 may be provided with a thermistor for temperature detection.

In the heating part 430, grease (not shown) is interposed between the heating belt 432 and each of the planar heating element 440 and the holding member 434.

In the fixing device 410 described above, the roller member 412 of the pressing part 414 and the unit including the planar heating element 440, the holding member 434, and the frame member 452 of the heating part 430 form the pressing region 470 in a state in which the heating belt 432 is nipped therebetween, and the recording medium holding an unfixed toner image is passed through the pressing region 470 to fix the unfixed toner image to the recording medium by application of heat and pressure.

<Image Forming Apparatus>

A description is provided of the image forming apparatus according to an exemplary embodiment.

The image forming apparatus according to the exemplary embodiment includes an image carrier, a charging device that charges the surface of the image carrier, a latent image forming device that forms a latent image on the charged surface of the image carrier, a developing device that develops the latent image with a toner to form a toner image, a transfer device that transfers the toner image onto a recording medium, and a fixing device that fixes the toner image onto the recording medium.

The fixing device according to the exemplary embodiment is used as the fixing device.

In the image forming apparatus according to the exemplary embodiment, the fixing device may be formed as a cartridge detachably attached to the image forming apparatus. That is, the image forming apparatus according to the exemplary embodiment may include the fixing device according to the exemplary embodiment as a component of a process cartridge.

The image forming apparatus of the exemplary embodiment will now be described with reference to the drawing.

Figure 4:
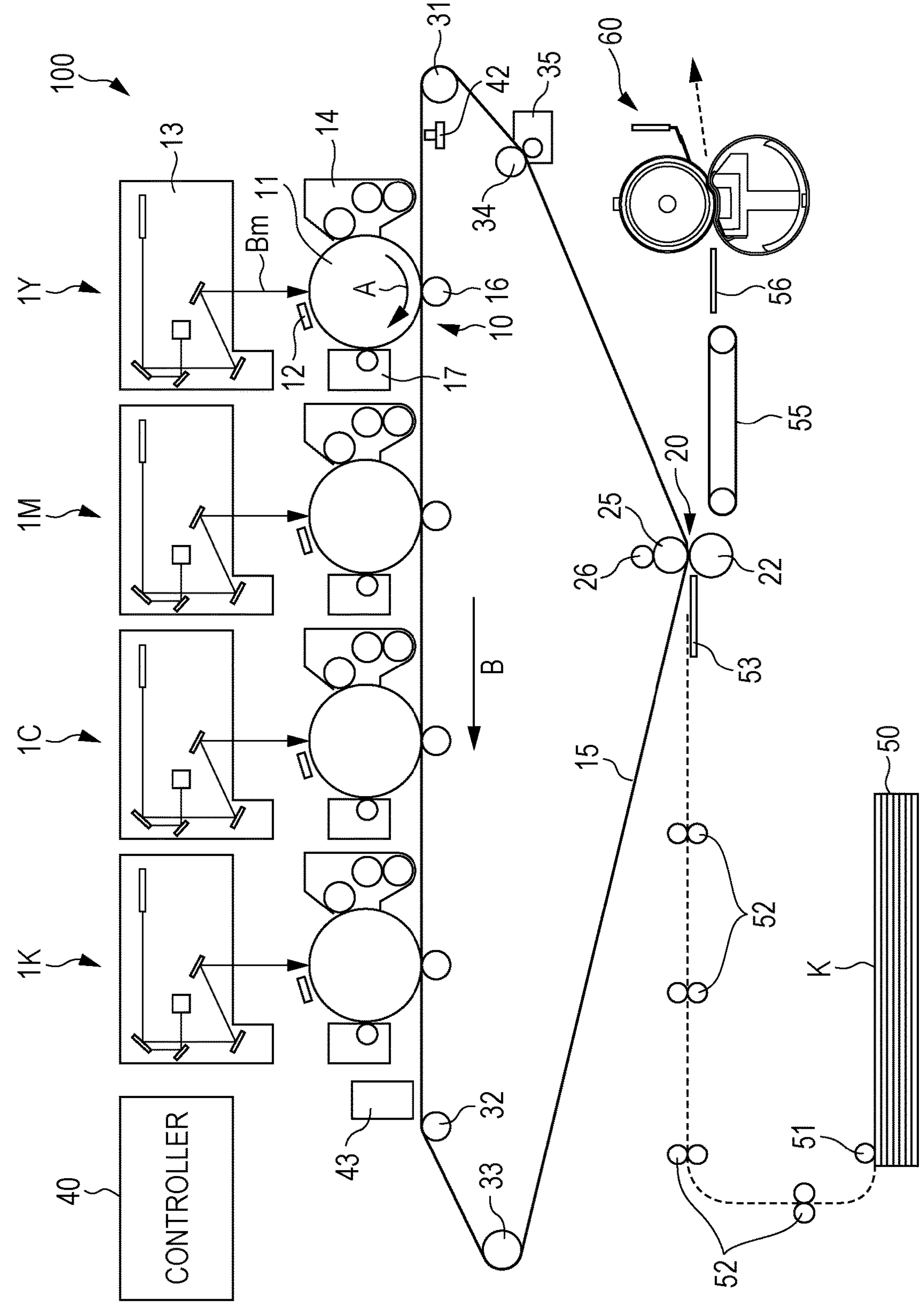
FIG. 4 is a schematic view illustrating an example of an image forming apparatus according to an exemplary embodiment.

FIG. 4 is a schematic view illustrating an example of the image forming apparatus according to the exemplary embodiment.

An image forming apparatus 100 according to the exemplary embodiment is, as illustrated in FIG. 4, for example, an intermediate transfer type image forming apparatus of a type generally called a tandem type, and includes a plurality of image forming units 1Y, 1M, 1C, 1K that form toner images of respective color components by electrophotography, primary transfer parts 10 that sequentially transfer (primary transfer) the toner images of respective color components formed by the image forming units 1Y, 1M, 1C, 1K onto an intermediate transfer belt 15, a secondary transfer part 20 that collectively transfers (secondary transfers) the superposed toner images transferred on the intermediate transfer belt 15 onto a sheet K as a recording medium, and a fixing device 60 that fixes the secondary transferred images onto the sheet K. The image forming apparatus 100 also has a controller 40 that controls the operations of various devices (various parts).

The fixing device 60 is the first exemplary embodiment of the fixing device described above. It is to be noted that the image forming apparatus 100 may be configured to include the fixing device according to the second exemplary embodiment described above.

Each of the image forming units 1Y, 1M, 1C, 1K of the image forming apparatus 100 includes a photoconductor 11 that rotates in a direction indicated by an arrow A as an example of an image carrier that carries a toner image formed on a surface thereof.

Around the photoconductor 11, a charging device 12 that charges the photoconductor 11 is provided as an example of a charging element, and a laser exposure device 13 (an exposure beam is indicated by reference sign Bm in FIG. 4) that writes an electrostatic latent image on the photoconductor 11 is provided as an example of a latent image forming element.

Around the photoconductor 11, as an example of a developing element, a developing unit 14 that contains a toner of each color component and visualizes an electrostatic latent image on the photoconductor 11 with the toner is provided, and a primary transfer roller 16 that transfers the toner image of each color component formed on the photoconductor 11 to the intermediate transfer belt 15 at the primary transfer part 10 is provided.

Moreover, a photoconductor cleaner 17 that removes residual toner on the photoconductor 11 is provided around the photoconductor 11, and electrophotographic devices including the charging device 12, the laser exposure device 13, the developing unit 14, the primary transfer roller 16, and the photoconductor cleaner 17 are sequentially arranged along the rotational direction of the photoconductor 11. The image forming units 1Y, 1M, 1C, 1K are arranged such that the image forming unit 1Y corresponding to yellow (Y), the image forming unit 1M corresponding to magenta (M), the image forming unit 1C corresponding to cyan (C), and the image forming unit 1K corresponding to black (K) are substantially linearly disposed in that order from an upstream side of the intermediate transfer belt 15.

The intermediate transfer belt 15, which is an intermediate transfer body, is a film-like pressure belt including a base layer made of resin, such as a polyimide or a polyamide, and a suitable amount of antistatic agent, such as carbon black, is contained in the base material layer. The intermediate transfer belt 15 has a volume resistivity in the range of $10^6$ Ω·cm or more and $10^{14}$ Ω·cm or less, and has a thickness of, for example, about 0.1 mm.

The intermediate transfer belt 15 is driven to circulate (rotate) by various rollers in the direction of an arrow B illustrated in FIG. 4 at a speed suitable for the purpose. The various rollers include a driving roller 31 that is driven by a motor (not illustrated) having an excellent constant speed property to rotate the intermediate transfer belt 15, a support roller 32 that supports the intermediate transfer belt 15 extending substantially linearly along the direction in which the photoconductors 11 are arranged, a tension applying roller 33 that applies a tension to the intermediate transfer belt 15 and functions as a correction roller to prevent meandering of the intermediate transfer belt 15, a back-surface roller 25 provided at the secondary transfer part 20, and a cleaning back-surface roller 34 provided at a cleaning part that scrapes off residual toner from the intermediate transfer belt 15.

The primary transfer part 10 is configured by the primary transfer roller 16 that is placed opposite to the photoconductor 11 across the intermediate transfer belt 15. The primary transfer roller 16 includes a core body, and a sponge layer as an elastic layer that is secured around the core body. The core body is a cylindrical bar made of metal such as iron or SUS. The sponge layer is a sponge-like cylindrical roller that is formed of a rubber blend of NBR, SBR, and EPDM combined with a conductive agent such as carbon black, and that has a volume resistivity of $10^{7.5}$ Ω·cm or more and $10^{8.5}$ Ω·cm or less.

The primary transfer rollers 16 are disposed in pressure contact with the photoconductors 11 with the intermediate transfer belt 15 interposed therebetween, and to each of the primary transfer rollers 16, a voltage (primary transfer bias) that is opposite in polarity to the charging polarity of the toner (that is, negative polarity, the same applies to the following description) is applied. Thus, toner images on the respective photoconductors 11 are successively electrostatically attracted to the intermediate transfer belt 15, and thereby a superposed toner image is formed on the intermediate transfer belt 15.

The secondary transfer part 20 includes the back-surface roller 25 and a secondary transfer roller 22 disposed at a toner-image-carrying surface side of the intermediate transfer belt 15.

The surface of the back-surface roller 25 is formed of a tube made of a rubber blend of EPDM and NBR in which carbon is dispersed, and the inside of the back-surface roller 25 is formed of an EPDM rubber. The back-surface roller 25 is formed so that its surface resistivity is $10^7$ Ω/sq or more and $10^{10}$ Ω/sq or less, and its hardness is set to, for example, 70° (Asker C: manufactured by KOBUNSHI KEIKI CO., LTD., the same applies hereinafter). The back-surface roller 25 is disposed on the inner side of the intermediate transfer belt 15 and functions as an electrode facing the secondary transfer roller 22, and a metallic power supplying roller 26 to which the secondary transfer bias is stably applied is disposed so as to be in contact with the back-surface roller 25.

The secondary transfer roller 22 includes a core body, and a sponge layer as an elastic layer that is secured around the core body. The core body is a cylindrical bar made of metal such as iron or SUS. The sponge layer is a sponge-like cylindrical roller that is formed of a rubber blend of NBR, SBR, and EPDM combined with a conductive agent such as carbon black, and that has a volume resistivity of $10^{7.5}$ Ω·cm or more and $10^{8.5}$ Ω·cm or less.

The secondary transfer roller 22 is disposed in pressure contact with the back-surface roller 25 with the intermediate transfer belt 15 therebetween, and the secondary transfer roller 22 is grounded so that a secondary transfer bias is formed between the secondary transfer roller 22 and the back-surface roller 25, whereby the toner image is secondary transferred to the sheet K transported to the secondary transfer part 20.

An intermediate transfer belt cleaner 35 for removing residual toner and paper dust on the intermediate transfer belt 15 after secondary transfer and cleaning the surface of the intermediate transfer belt 15 is provided downstream of the secondary transfer part 20 in the intermediate transfer belt 15 in a movable manner toward and away from the intermediate transfer belt 15.

The intermediate transfer belt 15, the primary transfer part 10 (primary transfer roller 16), and the secondary transfer part 20 (secondary transfer roller 22) correspond to an example of a transfer element.

A reference sensor (home position sensor) 42 that generates a reference signal functioning as a reference for controlling the timing of image formation in the image forming units 1Y, 1M, 1C, 1K is arranged on the upstream side of the yellow image forming unit 1Y. The reference sensor 42 is formed so as to recognize a mark on the inner side of the intermediate transfer belt 15, and generate the reference signal, so that, on the basis of an instruction from the controller 40 that has been issued based on the recognition of this reference signal, each of the image forming units 1Y, 1M, 1C, 1K starts forming images.

An image density sensor 43 for adjusting image quality is disposed on the downstream side of the black image forming unit 1K.

The image forming apparatus according to the exemplary embodiment includes, as a transport element that transports the sheet K, a sheet container 50 that contains the sheet K, a sheet feed roller 51 that pulls out one of the sheets K stacked in the sheet container 50 at a predetermined timing and transports the sheet K, transport rollers 52 that transport the sheet K that has been sent by the sheet feed roller 51, a transport guide 53 that sends the sheet K that has been transported by the transport rollers 52 to the secondary transfer part 20, a transport belt 55 that transports the sheet K that has been transported after being subjected to a secondary transfer operation by the secondary transfer roller 22 to the fixing device 60, and a fixation entrance guide 56 that guides the sheet K to the fixing device 60.

Next, a basic image formation process of the image forming apparatus according to the exemplary embodiment will be described.

In the image forming apparatus according to the exemplary embodiment, image data that is output from, for example, an image reading device (not shown) or a personal computer (PC) (not shown) is processed by an image processor (not shown), after which the image forming units 1Y, 1M, 1C, 1K form the images.

The image processor performs various image processing operations, such as shading correction, displacement correction, brightness/color space conversion, gamma correction, cropping and color adjustment, and movement correction on reflectance data that is input. The image data subjected to the image processing is converted into color material gradation data of the four colors Y, M, C, K, and then output to the laser exposure devices 13.

At the laser exposure devices 13, in accordance with the pieces of color material gradation data that have been input, the photoconductors 11 of the respective image forming units 1Y, 1M, 1C, 1K are irradiated with the exposure beams Bm emitted from, for example, semiconductor lasers. After the surfaces of the photoconductors 11 of the respective image forming units 1Y, 1M, 1C, 1K are charged using the respective charging devices 12, the surfaces of the photoconductors 11 are scanned and exposed by the laser exposure devices 13, so that electrostatic latent images are formed on the surfaces of the photoconductors 11. The formed electrostatic latent images are developed as toner images of the respective colors Y, M, C, K by the respective image forming units 1Y, 1M, 1C, 1K.

At the primary transfer parts 10 where the photoconductors 11 and the intermediate transfer belt 15 contact each other, the toner images formed on the photoconductors 11 of the image forming units 1Y, 1M, 1C, 1K are transferred to the intermediate transfer belt 15. More specifically, at the primary transfer parts 10, the primary transfer rollers 16 apply voltages (primary transfer biases) having a polarity that is opposite to the charging polarity of the toner (that is, negative polarity) to a base material of the intermediate transfer belt 15, so that the toner images are successively superimposed on the surface of the intermediate transfer belt 15, as a result of which the primary transfer operations are performed.

After the toner images have been sequentially primary transferred to the surface of the intermediate transfer belt 15, the intermediate transfer belt 15 is moved, so that the toner images are transported to the secondary transfer part 20. When the toner images are transported to the secondary transfer part 20, in the transport element, the sheet feed roller 51 rotates in accordance with a timing at which the toner images are transported to the secondary transfer part 20, and a sheet K of a desired size is supplied from the sheet container 50. The sheet K supplied by the sheet feed roller 51 is transported by the transport rollers 52, and reaches the secondary transfer part 20 through the transport guide 53. Before the sheet K reaches the secondary transfer part 20, the sheet K is stopped once, and a registration roller (not shown) is rotated in accordance with a timing at which the intermediate transfer belt 15 holding the toner images moves, so that the position of the sheet K and the positions of the toner images are adjusted.

At the secondary transfer part 20, the secondary transfer roller 22 is pressed against the back-surface roller 25 via the intermediate transfer belt 15. At this time, the sheet K, which has been transported at an appropriate timing, is nipped between the intermediate transfer belt 15 and the secondary transfer roller 22. Here, when the power supplying roller 26 applies a voltage (secondary transfer bias) having the same polarity as the charging polarity of the toner (that is, negative polarity), a transfer electric field is generated between the secondary transfer roller 22 and the back-surface roller 25. Then, unfixed toner images that are held by the intermediate transfer belt 15 are together electrostatically transferred to the sheet K at the secondary transfer part 20 where the sheet K is pressed by the secondary transfer roller 22 and the back-surface roller 25.

Thereafter, the secondary transfer roller 22 transports the sheet K to which the toner images are electrostatically transferred as it is with the sheet K being separated from the intermediate transfer belt 15, and the sheet K is transported to the transport belt 55 provided at a downstream side of the secondary transfer roller 22 in a sheet transportation direction. At the transport belt 55, the sheet K is transported to the fixing device 60 in accordance with an optimal transport velocity in the fixing device 60. The unfixed toner images on the sheet K that has been transported to the fixing device 60 are fixed to the sheet K by fixing with heat and pressure at the fixing device 60. Then, the sheet K with the fixed image is transported to a paper output storing section (not illustrated) provided in an output section of the image forming apparatus.

After the transfer of the toner images to the sheet K ends, residual toner remaining on the intermediate transfer belt 15 is transported to the cleaning part as the intermediate transfer belt 15 rotates, and is removed from the intermediate transfer belt 15 by the cleaning back-surface roller 34 and the intermediate transfer belt cleaner 35.

The exemplary embodiments have been described, but the present invention is not limited to the above-described exemplary embodiments, and various modifications, changes, and improvements may be made to the exemplary embodiments.

EXAMPLES

The present invention is described in further detail below with reference to examples. The present invention is not however limited to the examples described below.

Example 1

(Preparation of Cylindrical Mold Made of Aluminum)

An aluminum cylinder having an outer diameter of 30 mm and a length of 400 mm was provided, the surface of the cylinder was roughened to have an Ra of 0.8 μm by blasting with spherical glass particles (AS ONE Corporation, BZ-01, particle size: 0.105 to 0.125 mm) and coated with a silicone-based release agent (trade name: KS700, manufactured by Shin-Etsu Chemical Co., Ltd.), and the cylinder was baked at 300° C. for 1 hour to produce a cylindrical mold.

(Formation of Resin Base Material Layer)

Carbon nanotubes (denoted as CNTs, manufactured by Showa Denko K.K., VGCF-H) as a filler were dispersed in a commercially available polyimide precursor solution (U-Varnish-S, manufactured by Ube Industries, Ltd.) as a resin with a bead mill for 30 minutes to obtain a polyimide precursor solution in which the carbon nanotubes were dispersed. The obtained polyimide precursor solution in which carbon black was dispersed was mixed with N-methyl-2-pyrrolidone (NMP) as a solvent such that the solid content rate was 20% and the amount of carbon nanotubes was 10% by volume with respect to the resin base material layer after imidization, and the mixture was vacuum-mixed to obtain a coating liquid for forming a base material layer. The viscosity of the coating liquid for forming a base material layer was 22 Pa·s.

The coating liquid for forming a base material was applied to the surface of the aluminum cylindrical mold by outer surface spiral coating using a radial screw pump for supply and a Mohno pump for discharge, and the coating film was dried at 140° C. for 20 minutes.

The cylindrical mold was vertically placed in a heating furnace and heated at 130° C. for 25 minutes, 200° C. for 25 minutes, 250° C. for 25 minutes, and 315° C. for 25 minutes. After cooling, the product was removed from the cylindrical substrate to form a polyimide resin base material layer.

(Formation of Elastic Layer and Release Layer]

Primer No. 4 (manufactured by Shin-Etsu Chemical Co., Ltd.) was applied as an adhesive onto the outer peripheral surface of the obtained resin base material layer and dried. Thereafter, a coating liquid for forming an elastic layer obtained by diluting 85% by mass of a silicone rubber material (X-34-1972-3A/X-34-1972-3B=50/50 (mass ratio)) manufactured by Shin-Etsu Chemical Co., Ltd. with 15% by mass of butyl acetate was applied by outer surface spiral coating so as to have a film thickness of 200 μm and was dried and cured at 100° C. for 20 minutes. Thereafter, a primer (KE-1950-10A/KE-1950-10B=1/1 (mass ratio)) manufactured by Shin-Etsu Chemical Co., Ltd. was applied so as to have a thickness of 20 μm by outer surface spiral coating. Then, the primer was semi-cured by being dried at 50° C. for 60 minutes and covered with a PFA tube easy-adhesion treated by plasma treatment. After the air was removed, the product was heat-cured at 200° C. for 4 hours and cut into a width of 360 mm to obtain a fixing belt of Example 1.

Example 2

A fixing belt of Example 2 was obtained in the same manner as in Example 1, except that in the formation of the resin base material layer, the amount of carbon nanotubes in the coating liquid for forming a base material layer was 50% by volume with respect to the imidized resin base material layer.

Example 3

A fixing belt of Example 3 was obtained in the same manner as in Example 1, except that in the formation of the resin base material layer, the amount of carbon nanotubes in the coating liquid for forming a base material layer was 1% by volume with respect to the imidized resin base material layer.

Example 4

A fixing belt of Example 4 was obtained in the same manner as in Example 1, except that in the formation of the resin base material layer, the coating liquid for forming a base material layer was dispersed in the bead mill for 30 minutes.

As the carbon nanotubes (denoted as CNTs), carbon nanotubes having an average diameter of 0.15 μm and an average length of 0.75 μm were used.

Example 5

A fixing belt of Example 5 was obtained in the same manner as in Example 1 except that the mold was subjected to blasting with spherical glass particles (AS ONE Corporation, BZ-04, particle size: 0.350 to 0.500 mm).

As the carbon nanotubes (denoted as CNTs), carbon nanotubes having an average diameter of 0.15 μm and an average length of 0.75 μm were used.

Example 6

A fixing belt of Example 6 was obtained in the same manner as in Example 1 except that the mold was subjected to blasting with spherical glass particles (AS ONE Corporation, BZ-02, particle size: 0.177 to 0.250 mm).

As the carbon nanotubes (denoted as CNTs), carbon nanotubes having an average diameter of 0.15 μm and an average length of 0.75 μm were used.

Example 7

A fixing belt of Example 7 was obtained in the same manner as in Example 1 except that the mold was subjected to blasting with spherical glass particles (AS ONE Corporation, BZ-01, particle size: 0.105 to 0.125 mm).

As the carbon nanotubes (denoted as CNTs), carbon nanotubes having an average diameter of 0.15 μm and an average length of 0.75 μm were used.

Example 8

A fixing belt of Example 8 was obtained in the same manner as in Example 1, except that the mold was subjected to blasting with spherical glass particles (AS ONE Corporation, BZ-01, particle size: 0.105 to 0.125 mm) to roughen the mold surface to have an Ra of 0.7 μm.

As the carbon nanotubes (denoted as CNTs), carbon nanotubes having an average diameter of 0.15 μm and an average length of 0.75 μm were used.

Examples 9 to 11

Fixing belts of Examples 9 to 11 were obtained in the same manner as in Example 1 except that in the formation of the resin base material layer, the amount of carbon nanotubes in the coating liquid for forming a base material layer was changed to 15% by volume, 20% by volume, and 50% by volume, respectively, with respect to the imidized resin base material layer. As the carbon nanotubes (denoted as CNTs), carbon nanotubes having an average diameter of 0.15 μm and an average length of 0.75 μm were used.

Example 12

A fixing belt of Example 8 was obtained in the same manner as in Example 1, except that as the carbon nanotubes (denoted as CNTs), carbon nanotubes having an average diameter of 0.15 μm and an average length of 0.5 μm were used.

Examples 13 and 14

Fixing belts of Examples 13 and 14 were obtained in the same manner as in Example 1 except that in the formation of the resin base material layer, the amount of carbon nanotubes in the coating liquid for forming a base material layer was changed to 0.5% by volume and 53% by volume, respectively, with respect to the imidized resin base material layer.

Example 15

A fixing belt of Example 15 was obtained in the same manner as in Example 1, except that as the carbon nanotubes (denoted as CNTs), carbon nanotubes having an average diameter of 0.15 μm and an average length of 8 μm were used.

Example 16

A fixing belt of Example 16 was obtained in the same manner as in Example 1, except that the carbon nanotubes (denoted as CNTs) were replaced with needle-like titanium oxide particles having a short axis length of 0.13 μm and a long axis length of 2 μm.

Example 17

A fixing belt of Example 17 was obtained in the same manner as in Example 1, except that carbon nanotubes (denoted as CNTs) were replaced with scale-like boron nitride having a long axis length of 2 μm.

Comparative Example 1

A fixing belt of Comparative Example 1 was obtained in the same manner as in Example 1 except that the carbon nanotubes were not blended in the coating liquid for forming a base material layer.

Comparative Example 2

A fixing belt of Comparative Example 2 was obtained in the same manner as in Example 1 except that the blasting was not performed in the preparation of the aluminum cylindrical mold, and the amount of carbon nanotubes in the coating liquid for forming a base material layer was 1% by volume with respect to the imidized resin base material layer in the formation of the resin base material layer.

Comparative Example 3

A fixing belt of Comparative Example 3 was obtained in the same manner as in Example 1 except that the blasting was not performed in the preparation of the aluminum cylindrical mold.

Comparative Example 4

A fixing belt of Comparative Example 4 was obtained in the same manner as in Example 1, except that the mold was subjected to blasting with spherical glass particles (AS ONE Corporation, BZ-04, particle size: 0.350 to 0.500 mm) so that the mold surface might have an Ra of 2.0 the amount of carbon nanotubes in the coating liquid for forming a base material layer was 1% by volume with respect to the imidized resin base material layer in the formation of the resin base material layer, and carbon nanotubes having an average diameter of 0.15 μm and an average length of 0.5 μm were used as the carbon nanotubes (denoted as CNTs).

<Evaluation>

(Various Kinds of Measurement)

The following properties of the fixing belt of each example were measured by the method described above.

An average of the power spectral density at a wavelength of 10 μm or more and 50 μm or less in a measurement of a Fourier transform power spectrum of a surface profile of an inner peripheral surface An average of the power spectral density at a wavelength of 2 μm or more and 6 μm or less in a measurement of a Fourier transform power spectrum of a surface profile of an inner peripheral surface (Initial Sliding Properties, Initial Noise, and Temporal Sliding Properties)

The fixing belt of each example as the heating belt 432 was attached to the fixing device illustrated in FIG. 3.

In the fixing device, grease was interposed between the heating belt 432 and each of the planar heating element 440 and the holding member 434.

The fixing device was mounted on an image forming apparatus ("ApeosPort C5570" manufactured by FUJIFILM Business Innovation Corporation).

Using the image forming apparatus, a running test in which an image was output on 1,000,000 sheets of A4 paper was performed.

Then, regarding the fixing belt, whether or not the shaft torque of the pressure roller was equal to or smaller than the target of 0.8 Nm was checked in terms of the initial sliding properties at the start of the fixing operation, and the initial noise was checked. The shaft torque values of the pressure roller at the time of examining the initial noise are shown.

Meanwhile, the initial noise and the shaft torque value of the pressure roller were examined as the temporal sliding properties after the running test. The evaluation criteria for the noise are as follows.

—Noise—

A: No sliding sound is heard

B: A slight sliding sound is heard

C: A clear sliding sound is heard

The results are shown in Table 1.

The details of abbreviations in Table 1 are as follows.

PI: polyimide resin

CNT: carbon nanotubes

TABLE 1

| | | Resin base material layer | | | | | |
|---|---|---|---|---|---|---|---|
| | | | Filler | | | | |
| | Mold surface treatment | Resin Type | Type | Average diameter (or short axis length) μm | Average length (or long axis length) μm | Aspect ratio | Amount % by volume |
| Example 1 | Blasting | PI | CNT | 0.15 | 2 | 13 | 10 |
| Example 2 | Blasting | PI | CNT | 0.15 | 2 | 13 | 50 |
| Example 3 | Blasting | PI | CNT | 0.15 | 2 | 13 | 1 |
| Example 4 | Blasting | PI | CNT | 0.15 | 0.75 | 5 | 10 |
| Example 5 | Blasting | PI | CNT | 0.15 | 0.75 | 5 | 10 |
| Example 6 | Blasting | PI | CNT | 0.15 | 0.75 | 5 | 10 |
| Example 7 | Blasting | PI | CNT | 0.15 | 0.75 | 5 | 10 |
| Example 8 | Blasting | PI | CNT | 0.15 | 0.75 | 5 | 10 |
| Example 9 | Blasting | PI | CNT | 0.15 | 0.75 | 5 | 15 |
| Example 10 | Blasting | PI | CNT | 0.15 | 0.75 | 5 | 20 |
| Example 11 | Blasting | PI | CNT | 0.15 | 0.75 | 5 | 50 |
| Example 12 | Blasting | PI | CNT | 0.15 | 0.5 | 3 | 10 |
| Example 13 | Blasting | PI | CNT | 0.15 | 2 | 13 | 0.50 |
| Example 14 | Blasting | PI | CNT | 0.15 | 2 | 13 | 53.00 |
| Example 15 | Blasting | PI | CNT | 0.15 | 8 | 53 | 10 |
| Example 16 | Blasting | PI | Needle-like titanium oxide | 0.13 | 2 | 15 | 10 |
| Example 17 | Blasting | PI | Scale-like boron nitride | — | 2 | — | 10 |
| Comparative Example 1 | Blasting | PI | None | — | — | — | — |
| Comparative Example 2 | None | PI | CNT | 0.15 | 2 | 13 | 10 |
| Comparative Example 3 | None | PI | CNT | 0.15 | 2 | 13 | 1 |
| Comparative Example 4 | Blasting | PI | CNT | 0.15 | 0.5 | 3 | 1 |

| | Fourier transform power spectrum of surface shape of inner peripheral surface of fixing belt (average of power spectral density in each wavelength region) | | | Evaluation | | | |
|---|---|---|---|---|---|---|---|
| | Wavelength 2 to 6 μm (A) | Wavelength 10 to 50 μm (B) | Ratio A/B | Initial sliding properties shaft torque of pressure roller [Nm] | Initial noise | Temporal sliding properties shaft torque of pressure roller [Nm] | Temporal noise |
| Example 1 | 8.8 | 10.2 | 0.86 | 0.7 | A | 0.6 | A |
| Example 2 | 9.4 | 10.4 | 0.90 | 0.7 | A | 0.6 | A |
| Example 3 | 8.4 | 9.6 | 0.88 | 0.7 | A | 0.6 | A |

TABLE 1-continued

| | | | | | | | |
|---|---|---|---|---|---|---|---|
| Example 4 | 8.7 | 9.5 | 0.92 | 0.75 | B | 0.6 | A |
| Example 5 | 8.7 | 10.5 | 0.83 | 0.7 | B | 0.6 | A |
| Example 6 | 8.8 | 10.3 | 0.85 | 0.7 | A | 0.6 | A |
| Example 7 | 8.7 | 9.7 | 0.90 | 0.7 | A | 0.6 | A |
| Example 8 | 8.7 | 9.6 | 0.91 | 0.75 | B | 0.6 | A |
| Example 9 | 8.8 | 10.0 | 0.88 | 0.7 | A | 0.6 | A |
| Example 10 | 9.0 | 11.0 | 0.82 | 0.7 | B | 0.6 | A |
| Example 11 | 9.2 | 11.2 | 0.82 | 0.7 | B | 0.6 | A |
| Example 12 | 8.4 | 9.8 | 0.86 | 0.7 | A | 0.6 | A |
| Example 13 | 8.2 | 9.5 | 0.86 | 0.7 | A | 0.6 | A |
| Example 14 | 9.4 | 10.4 | 0.90 | 0.7 | A | 0.6 | A |
| Example 15 | 9.0 | 10.0 | 0.90 | 0.7 | A | 0.6 | A |
| Example 16 | 8.6 | 9.7 | 0.89 | 0.7 | A | 0.6 | A |
| Example 17 | 8.9 | 10.9 | 0.82 | 0.7 | B | 0.7 | A |
| Comparative Example 1 | 8.3 | 8.5 | 0.98 | 0.7 | C | 0.95 | B |
| Comparative Example 2 | 9.1 | 9.5 | 0.97 | 0.85 | C | 0.7 | A |
| Comparative Example 3 | 9.0 | 9.4 | 0.95 | 0.9 | C | 0.7 | B |
| Comparative Example 4 | 8.3 | 12.1 | 0.69 | 0.65 | C | 0.7 | B |

It is clear from the above results that the fixing belts according to Examples are superior to the fixing belts according to Comparative Examples in terms of initial sliding properties and initial noise and suppress an increase in initial sliding resistance even when grease is used as a lubricant.

It is understood that the fixing belts according to Examples are good in the evaluation of temporal sliding properties and temporal noise, and suppress an increase in sliding resistance over time.

What is claimed is:

1. A fixing belt, wherein, in a measurement of a Fourier transform power spectrum of a surface profile of an inner peripheral surface of the fixing belt, a ratio of an average of a power spectral density at a wavelength of 2 μm or more and 6 μm or less to an average of a power spectral density at a wavelength of 10 μm or more and 50 μm or less is 0.82 or more and 0.92 or less.

2. The fixing belt according to claim 1, wherein the ratio of the average of the power spectral density at a wavelength of 2 μm or more and 6 μm or less to the average of the power spectral density at a wavelength of 10 μm or more and 50 μm or less is 0.85 or more and 0.90 or less.

3. The fixing belt according to claim 1, wherein the average of the power spectral density at a wavelength of 10 μm or more and 50 μm or less is 9.5 or more and 11 or less.

4. The fixing belt according to claim 3, wherein the average of the power spectral density at a wavelength of 10 μm or more and 50 μm or less is 9.6 or more and 10 or less.

5. The fixing belt according to claim 1, wherein the inner peripheral surface is formed of a resin base material layer, and the fixing belt comprises an elastic layer and a release layer in the stated order on the resin base material layer.

6. The fixing belt according to claim 5, wherein the resin base material layer contains a needle-like or fibrous filler.

7. The fixing belt according to claim 6, wherein the needle-like or fibrous filler has an aspect ratio of 5 or more.

8. The fixing belt according to claim 6, wherein the needle-like or fibrous filler accounts for 1% by volume or more and 50% by volume or less of the resin base material layer.

9. A fixing device comprising:

the fixing belt according to claim 1;

a rotary member disposed in contact with an outer peripheral surface of the fixing belt;

a pressing member disposed inside the fixing belt and configured to press the fixing belt against the rotary member from the inner peripheral surface of the fixing belt; and grease interposed between the inner peripheral surface of the fixing belt and the pressing member.

10. An image forming apparatus comprising:

an image carrier;

a charging device configured to charge a surface of the image carrier;

a latent image forming device configured to form a latent image on the charged surface of the image carrier;

a developing device configured to develop the latent image with a toner to form a toner image;

a transfer device configured to transfer the toner image onto a recording medium; and the fixing device according to claim 9, which is configured to fix the toner image on the recording medium.

* * * * *